United States Patent Office 3,363,963
Patented Jan. 16, 1968

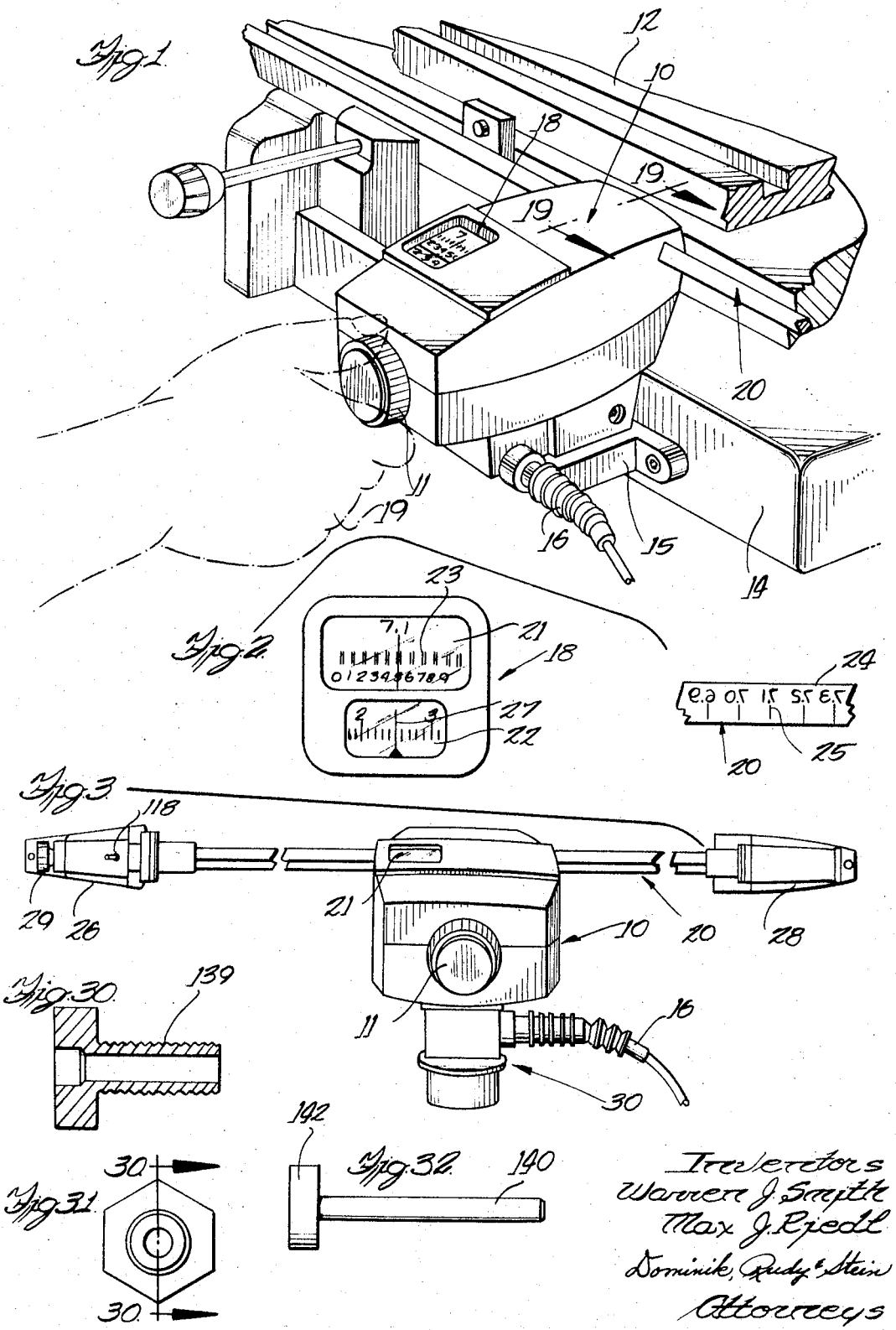

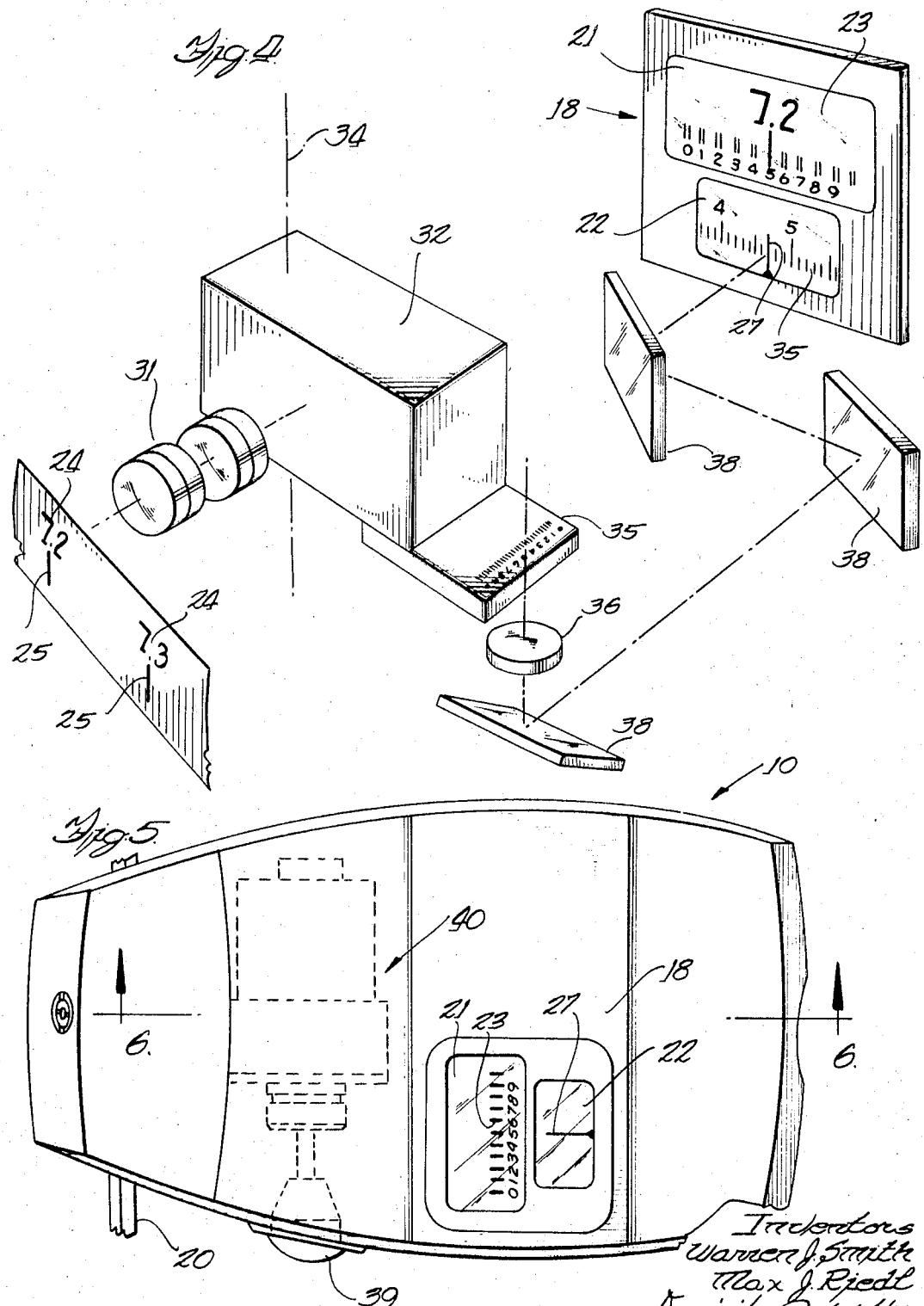

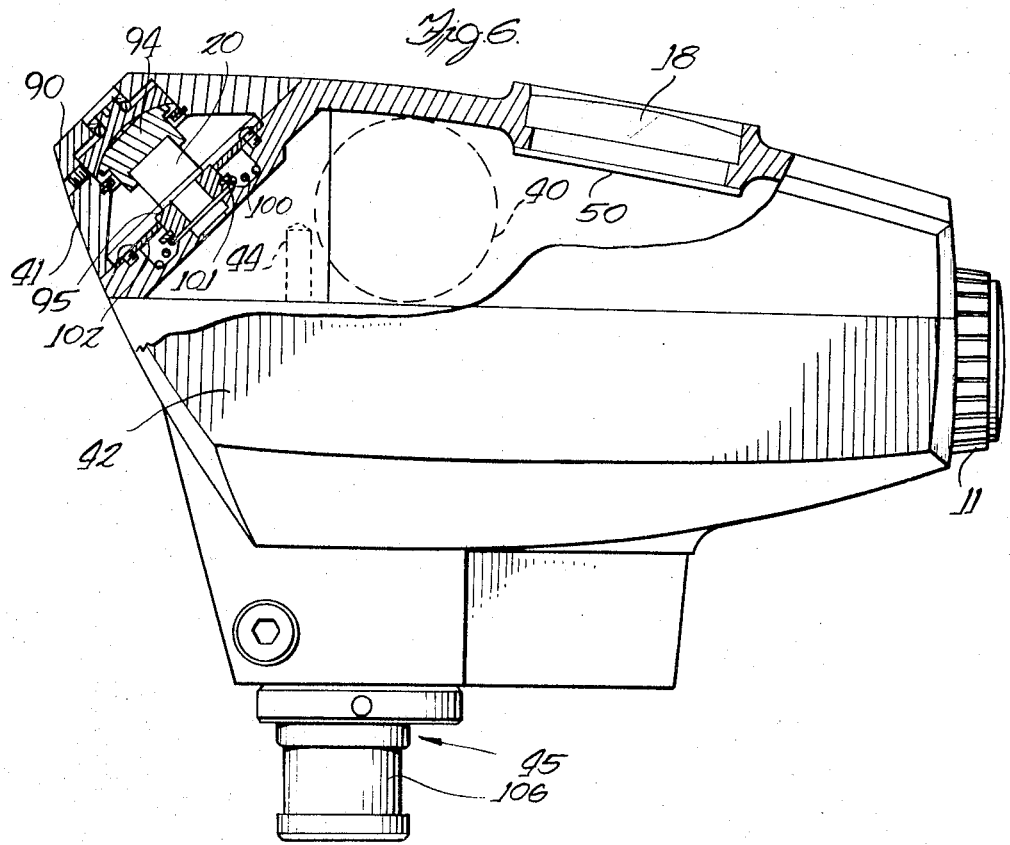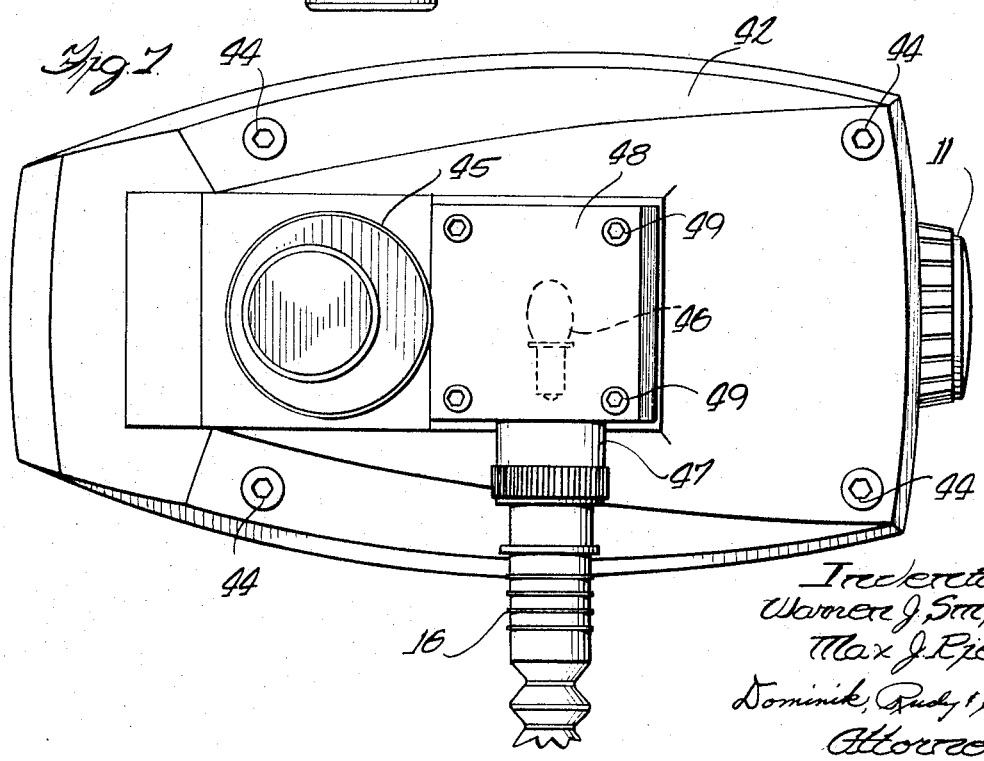

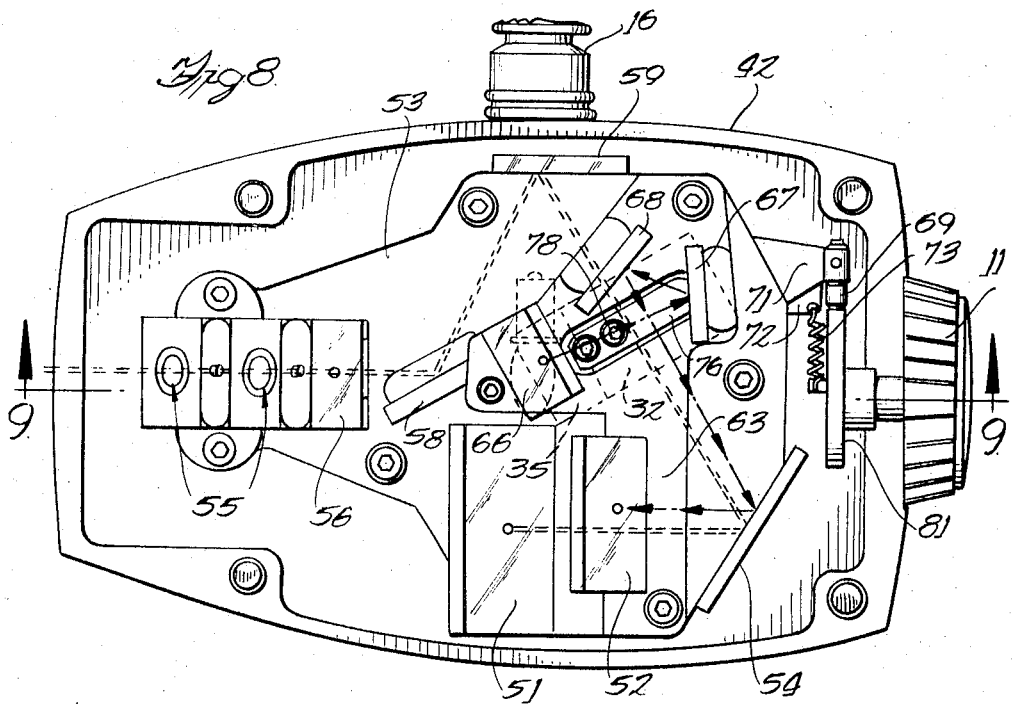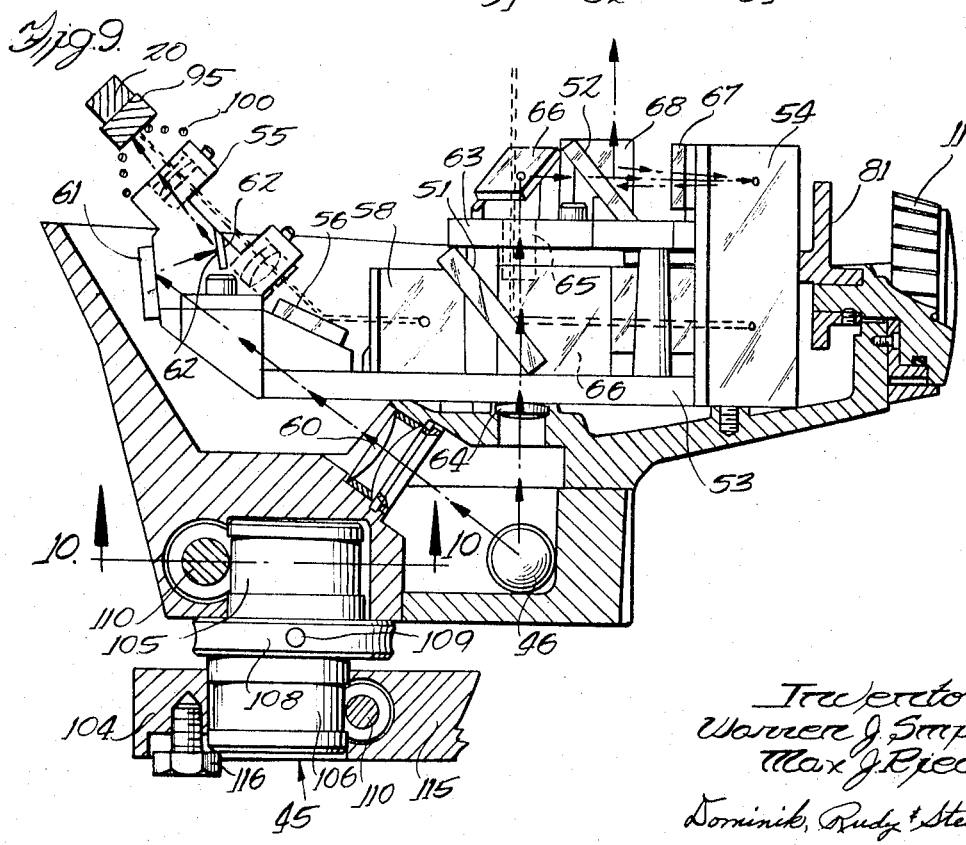

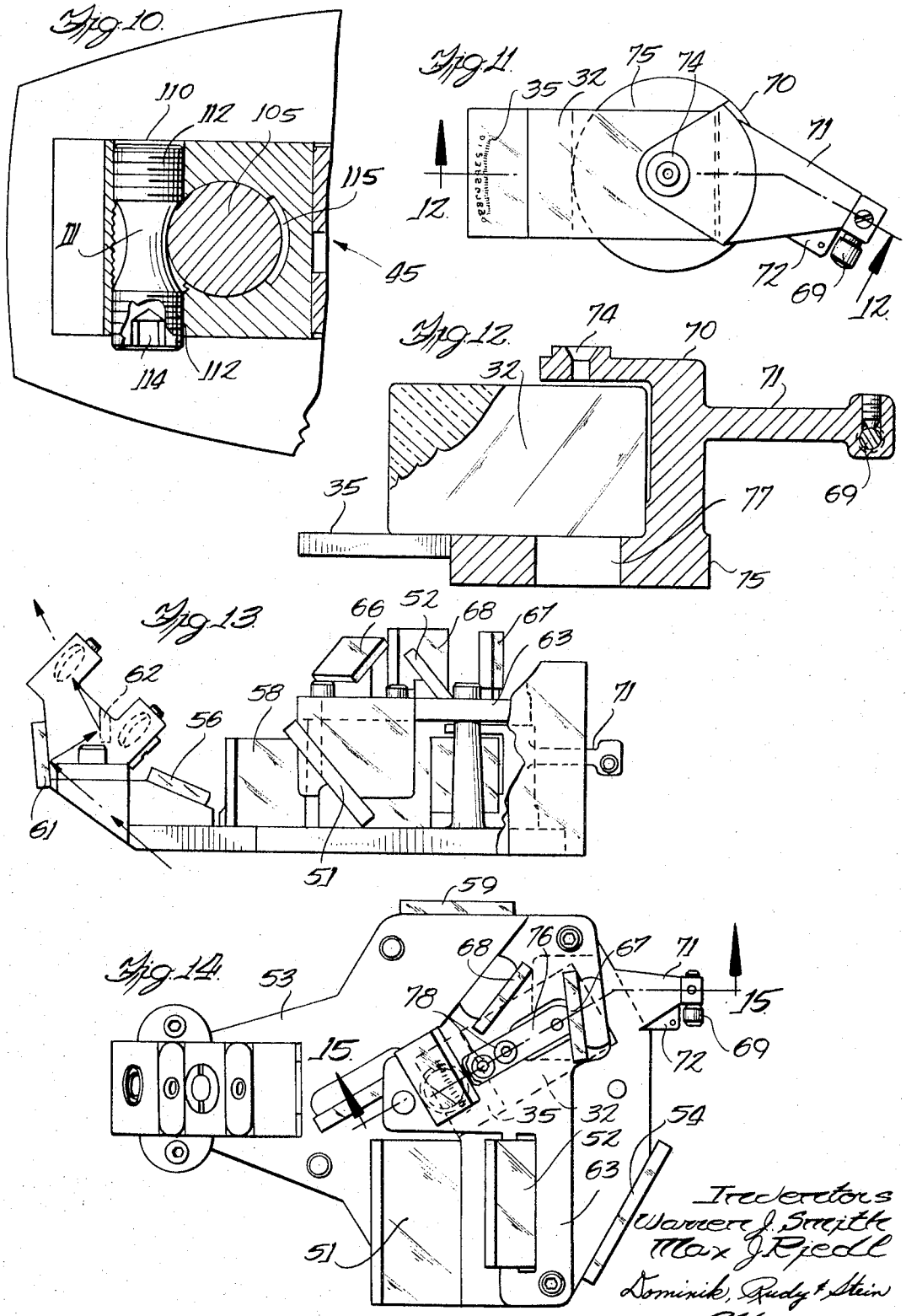

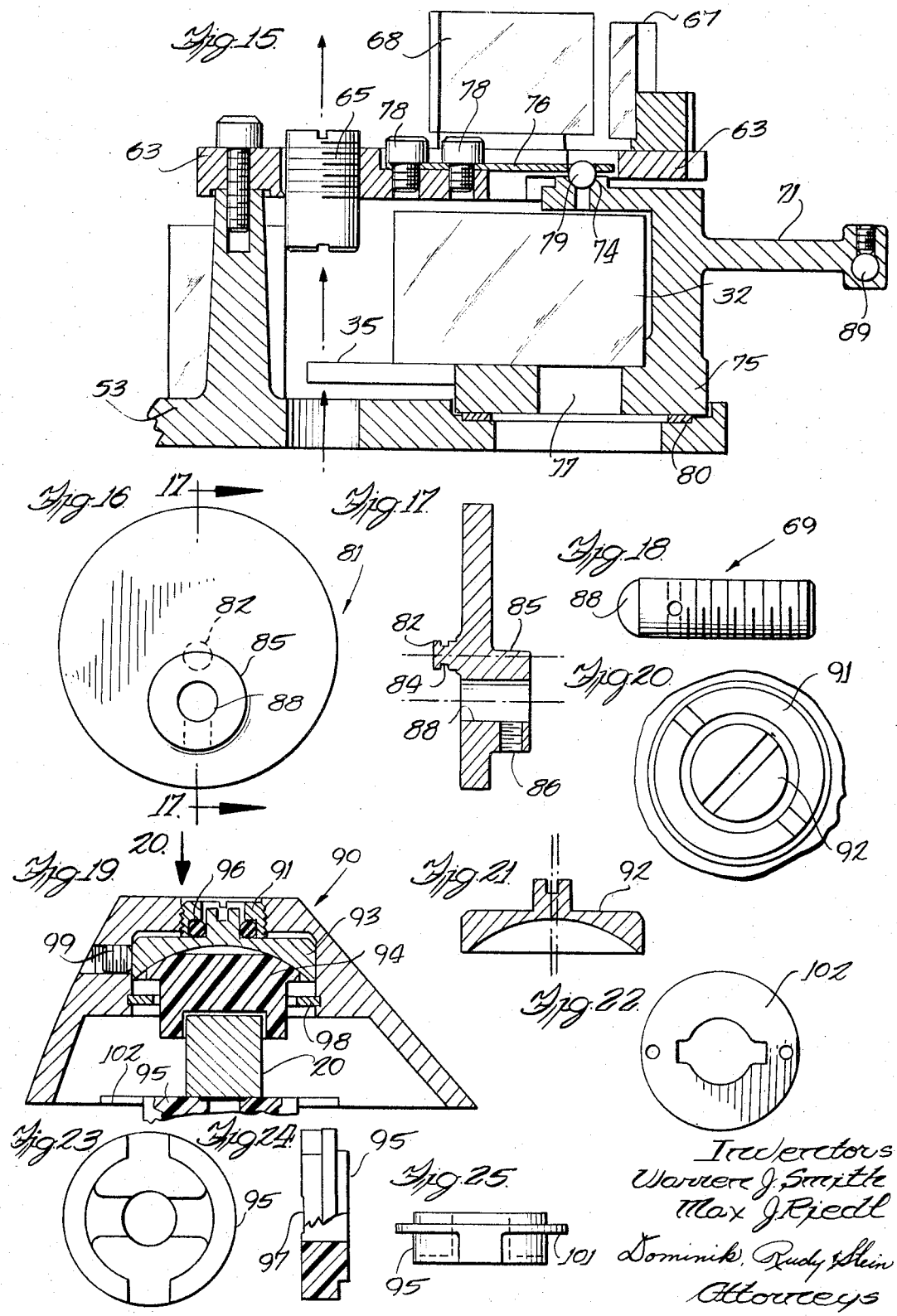

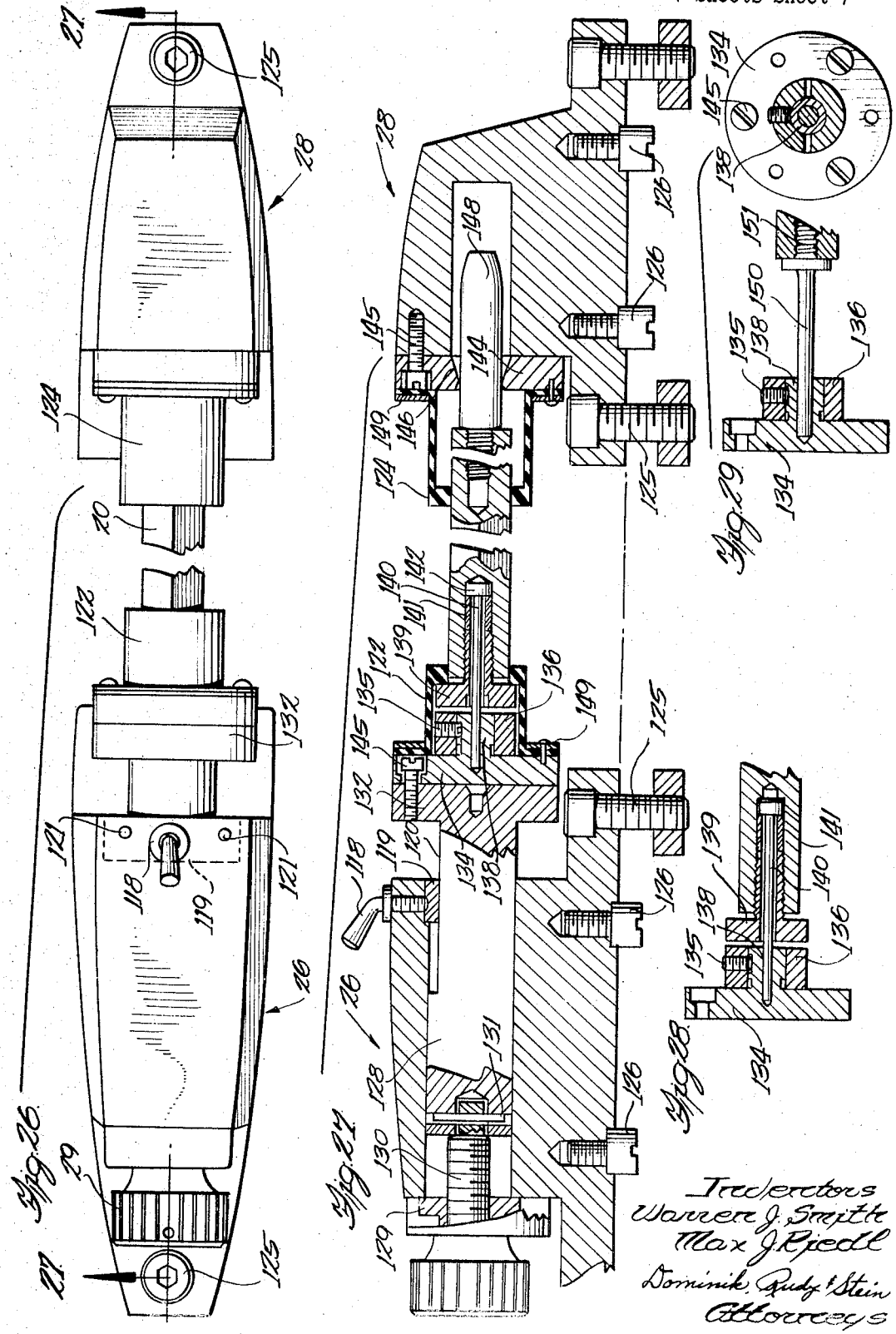

3,363,963
PRECISION OPTICAL MEASURING DEVICE
AND METHOD
Warren J. Smith and Max J. Riedl, Santa Barbara, Calif., assignors to Infrared Industries, Inc., Santa Barbara, Calif., a corporation of Delaware
Filed Oct. 11, 1963, Ser. No. 315,593
6 Claims. (Cl. 350—112)

ABSTRACT OF THE DISCLOSURE

A precision optical reader using a prism block to laterally displace an image of the division between two reference points on a scale, in combination with a radial scale affixed to the prism in a fashion such that the indicia thereof is projected so as to provide an interpolation of the distance between the two reference points, the same being coordinated to the rotation of the prism.

---

The present invention relates to a precision measuring device and method, and more specifically to a precision optical measuring device, a scale, a mount for the scale, and method relating to specific phases of optical measurements of linear scales.

Various devices have been proposed, and are commercially in use employing an optical reader to measure the distance of bed travel of a machine tool having a precision scale mounted to its moving bed. These readers are generally attached to the fixed bed or a fixed portion of the machine tool, and positioned so that the scale passes an optical assembly for reading the intelligence appearing on the scale. Such units, however, have often required complex modification of the machine tool in order to be installed thereon. As a general rule, most of them are supplied as "original equipment," or supplied by the original equipment manufacturer with special adaptations for mounting to his particular machines. In addition, the manufacture of the scales for use in such units has oftentimes been highly complex and accordingly has substantially increased the cost of the scales and exhibited inherent potential inaccuracies which required constant checking and additionally increased the expense element. Furthermore, the mounting of such scales on the various machine tools introduced additional possible alignment error, and thus required some expense in modification.

The readers employed with the heretofore known optical systems for measuring invariably require the interpretation of readings, or the interpretations of particular graduations on the scale, and thus do not furnish the operator with a direct reading scale with which a high degree of accuracy may be achieved.

In view of the foregoing, it is one of the principal objects of the present invention to provide a precision measuring device of optical character in which a projected image shows all the information for direct reading in a single window area.

A related object is to achieve a simplification of reading because the scale indicia concerns itself with an integral number of decimal digits or places, and thus no addition of separate readings or combination readings are required.

To achieve the result contemplated by the invention, a prism block is utilized to laterally displace the image of the division between two reference points on a scale, and read the division therebetween by an interpolation of the angular rotation of the prism to the divisions between indicia. Because a prism block displacement is employed, such disadvantages as wear, backlash, and the like are virtually eliminated from the operation of the reader and scale.

A further and more detailed object of the invention is to utilize a single light source to project the image of the measuring scale as well as the angular displacement of the prism onto the single viewing window where direct reading is achieved.

A further object of the invention is to provide scale constraint to a constant distance from the optical system, thereby accommodating variance in the scale alignment. Additionally, slide bearing wear relating to the reader and the scale is readily compensated by the focusing mechanism.

Still another object of the invention is to provide a scale and reader in which moving parts which may wear and thereby affect accuracy, are eliminated by providing spring-loaded conical seats on the prism mount, and a prism rotating device, the wear of which has no effect upon reading.

A more detailed object of the invention is to provide an eccentric adjustment sphere for the focus, which permits the orienting of the focus and the scale to various misalignments of the scale inherent in larger machine tool operation.

Still another object of the invention is to provide an optical system which is compacted in the reader to orient a timer within the hermetically sealed housing for the reader.

Yet another object of the invention is to provide a scale for use with a precision optical reader in which the graduations are spaced at one-tenth of an inch, thereby substantially permitting the reduction of manufacturing and maintenance costs.

A related object of the invention is to provide scale supports which are reversible end for end, thereby permitting a zero adjustment to be placed at either end of the scale.

Still another object of the invention is to provide floating scale support adjustment coupled with flexible mounting which permits the orientation of the scale with a minimum of effort to a parallelism with the machine tool bed of the host unit better than plus or minus .001 inch.

Another object of the invention looks to the provision of a reader mount adjustment to bring the reader into an established relationship with the moving bed and scale, thereby permitting fine final adjustments of the scale by its end supports.

Still another and quite important object of the invention is to provide an optical division system of the indicia on the scale which is self-proving as to magnification and calibration of the prism block for all positions on the scale.

Yet another object of the invention is to provide a scale, mount for the same, and a reader and mount in which adjustment tolerances of plus or minus one-eighth of an inch for the reader and plus or minus $\frac{1}{32}$ of an inch for the end support adjustment is made possible.

Further objects and advantages of the present invention will become apparent as the following description of an illustrative embodiment proceeds, in which:

FIG. 1 is a perspective partially broken view illustrating the precision optical reader, scale and machine tool mounting in actual operation.

FIG. 2 is an enlarged front elevation of the reader viewing window diagrammatically illustrating the relationship to the scale.

FIG. 3 is a front elevation, partially broken, of the machine tool installation illustrated in FIG. 1.

FIG. 4 is an enlarged, exploded, diagrammatic, simplified illustration of the principal elements of the optical system of the reader.

FIG. 5 is a top view of the reader, illustrating in broken fashion the relationship to the scale, and showing the timing mechanism within the reader in phantom lines.

FIG. 6 is a side elevation of the reader showing the upper half, taken along section lines 6—6 of FIG. 5.

FIG. 7 is a bottom view of the reader showing the position and orientation of the illuminating light in phantom lines.

FIG. 8 is a top view of the reader with the top housing removed, and showing in parallel dotted lines the projection path of the scale image, and in single dotted lines with an arrowhead the projection path of the prism sector projection.

FIG. 9 is a transverse sectional view taken along section 9—9 of FIG. 8, illustrating diagrammatically the projection paths as shown in FIG. 8, and additionally showing the path of illumination from the lamp to the scale.

FIG. 10 is a transverse enlarged sectional view of the reader mounting assembly taken along section 10—10 of FIG. 9.

FIG. 11 is a top view of the prism block assembly.

FIG. 12 is a transverse sectional view of the prism block assembly taken along section line 12—12 of FIG. 11.

FIG. 13 is a side elevational view of the mirror assembly.

FIG. 14 is a top view of the mirror assembly shown in FIG. 13.

FIG. 15 is a transverse sectional view of the upper mirror assembly and prism block assembly relationship taken along line 15—15 of FIG. 14.

FIG. 16 is a front elevation of the prism cam.

FIG. 17 is a transverse sectional view of the prism cam taken along section line 17—17 of FIG. 16.

FIG. 18 is an enlarged front elevational view of the cam follower assembly.

FIG. 19 is an enlarged transverse sectional view of the focus assembly taken along section line 19—19 of FIG. 1.

FIG. 20 is a front elevational view of the focusing adjustment head, viewed as shown at orientation arrow 20 of FIG. 19.

FIG. 21 is a transverse sectional view of the eccentric scale adjustment illustrating the two center lines for the spherical segmented cut-out portion and the axis of rotation.

FIG. 22 is a front elevation of the retaining ring for the inner scale slide.

FIG. 23 is a front elevation of the inner scale slide.

FIG. 24 is an end view partially cut-away of the inner scale slide shown in FIG. 23.

FIG. 25 is an end view of the inner scale slide, illustrating in dotted lines the cut-away and central apertured portions.

FIG. 26 is a top view in enlarged scale, partially broken, disclosing the front elevational view of the scale end supports.

FIG. 27 is a transverse sectional view of the scale and end supports taken along section line 27—27 of FIG. 26.

FIG. 28 is an enlarged transverse sectional view of the scale end support at the adjutable end of the scale, illustrating how the scale is flexibly mounted to the end support.

FIG. 29 shows an alternative embodiment of the scale end support shown in FIG. 28.

FIG. 30 is an enlarged transverse sectional view of the scale end support mounting sleeve, taken along section line 30—30 of FIG. 31.

FIG. 31 is an end view of the scale end support sleeve shown in FIG. 30.

FIG. 32 is a front elevation of the torsion rod support member employed on the zero reading adjustable end support.

The invention will be best understood by reviewing the various elements in the environment of their commercial application. Referring now to FIG. 1, it will be seen that the reader 10 is affixed by means of a reader mounting base bracket 15 to a machine tool frame 14. A moving machine tool bed 12, such as the moving bed on a milling machine or jig boring machine, is employed to affix the scale 20 for movement back and forth through the reader 10. The precise position of the moving bed 12, when measurement is to be made, is viewed in the window 18 by the operator 19 grasping the adjusting knob 11, and moving the same until the precise reading is achieved. The window 18 is clearly illuminated by means of an interiorly mounted light bulb which is powered by the light cord 16 plugged into any remote source of standard power. Thus in operation, the operator merely observes the picture in the window 18, without reference to any direct readings off of the precision scale 20.

Referring now to FIG. 2, a picture of a particular reading is shown therein. The projected scale window 21 reveals the scale indicia as shown, including both scale numbers 24 and the scale lines 25. The reference indicia appearing on the scale 20, particularly shown in FIG. 2, are reversed, but projected into the projected scale window 21 for direct reading as shown in FIG. 2. It will be noted that there are division parallel guide lines 23 affixed to the projected scale window 21, as will be disclosed in detail hereinafter. The operator, after the moving bed 12 has come to a stop, turns the adjusting knob 11 until the projected scale line 25 appears precisely positioned between one of the division parallel guide lines 23. In adjusting the knob 11 to achieve this orientation of the scale line 25 between the division parallel guide lines 23, the sector reference line 27 appears at a point on the sector scale 35 and in the precision scale window 22. Thus the reading shown in FIG. 2, which may be taken in a matter of seconds, is precise to the dimension of 7.1525 inches. Readings to the nearest ten thousandths of an inch are common with the commercial embodiment of the subject invention, and yet are readily achieved with a scale in which the scale lines 25 are on one-tenth inch spacing, and the scale numbers 24 require two or three digits, depending upon the length of the scale.

The relationship between the reader 10 and its associated scale 20, and how the same is mounted to the moving machine tool bed 12, is more broadly illustrated in FIG. 3. It will be seen that the reader 10 is affixed to a reader adjustable support 30, the same being affixed to the reader mounting bracket 15 in a manner to be described in detail hereinafter. At the left hand portion of the scale 20 (but fully reversible) is an adjustable scale mount 26. The operator, by releasing the zero adjusting lock screws 118 and turning the scale adjustment knob 29, may move the scale 20 left or right so that the position of the scale as shown in FIG. 2 can be adjusted to a zero reading. This is important in proving out the scale at any position, because the scale lines 25 will then be arranged in parallel flanking manner with the division parallel guide lines 23 at both ends of the projected scale window 21. In the event that the scale is inaccurate, the focus is inaccurate, or the reader is otherwise improperly oriented with the scale 20, the adjacent scale lines 25 will not line up at the two zero positions of the division parallel guide lines 23. The other end of the scale 20 is mounted to a fixed scale mount 28. As indicated above, the two mounts, the adjustable scale mount 26 and the fixed scale mount 28, can be reversed end for end without disturbing the orientation of the scale 20, and in such machine tool applications where the adjustability of the scale is better achieved from the right end portion thereof, the adjustment can be readily made in the field both from an initial standpoint of installation, or from a standpoint of the particular job for which reversal is required.

The basic principles of the optical system are disclosed diagrammatically in FIG. 4. As will be described in detail hereinafter, numerous additional details of optical construction are involved, but the principle is illustrated for purposes of simplicity and clarity in FIG. 4. As will be noted, the scale numbers 24 are actually reversed on the scale, and are immediately picked up by means of the objective lens 31, and thereafter transmitted through the prism 32, the prism 32 being mounted for rotation about the prism pivot axis 34. The scale numbers and scale lines 24, 25, are translated directly through the prism 32 and on to the projected scale window 21. Upon reaching the projected scale window 21, there is a random possibility that the scale line 25 will appear any place between the zero points on the division parallel guide lines. The operator then adjusts the adjusting knob 11, as set forth above, the adjusting knob being connected through a cam construction to rotate the prism 32 about its axis 34. The prism then refracts the image of the scale numbers 24 and scale lines 25, until they are positioned precisely between the division parallel guide lines 23 and in this instance at the number 5.

At the same time the prism block 32 is being rotated, the sector scale 35 on the prism block similarly rotates. The indicia on the sector scale 35 are transmitted by means of the sector projecting lens 36, and the sector reflecting system mirrors 38, until the sector scale 35 appears within the precision scale window 22. At this point the precise reading is taken from the position indicated by the sector reference line 27. In the present instance, the precise position of travel of the scale would be read as 7.2547 inches. In the entire system there are no gage blocks employed, and the only moving part is the prism 32 as it rotates about its prism pivot axis 34. Since the mounting of the prism 32 is in conical bearings, as will be described hereinafter, even wear on these bearings will still retain the prism pivot axis 34 in its preadjusted location, and accordingly misalignment or poor adjustment due to wear is virtually impossible. The lens system, and more particularly the objective lenses 31, as will be described in greater detail hereinafter, are also the subject of an adjustable focus and positioning system in which wear is readily compensated, and accordingly the dimensional readings may be obtained with a remarkable accuracy.

As will be seen in FIGS. 5, 6, and 7, the reader 10 comprises a top housing 41 and a bottom housing 42. These units are preferably cast, but could be molded of plastic, or fabricated, as manufacturing economies and usage dictate. The orientation of the mirror system to accomplish the optical system as generally outlined in FIG. 4 is such that room is provided within the reader housing for a timer 40, actuated by a hermetically sealed switch button 39. The timer 40 is outlined in phantom lines in FIGS. 5 and 6. The top housing is secured to the bottom housing by the housing assembly screws 44. As will be noted in the bottom view of FIG. 7, the unit can be opened by removing the four mounting screws 44 for whatever internal adjustment may be required. In addition, the illumination light bulb 46 (shown in phantom lines in FIG. 7) may be reached by removing the light bulb access panel 48 upon the removal of the light bulb access panel mounting screws 49. Because of the use of the timer 40, the window 18 is illuminated only for short periods of time, when an actual reading is being made. For this reason, the life of the illumination light bulb 46 is extended very substantially, and it is contemplated that removal and replacement of the light bulb will be on a highly infrequent basis. The light bulb is readily replaceable without removing the light bulb access panel 48. The cord 16 carries a clamp screw assembly 47 (see FIG. 7) which contains the light bulb socket and bulb. Release of the clamp screw permits ready removal and replacement of the light bulb 46. The reader is mounted on an eccentric type reader adjustable support 45. This adjustable support 45 permits adjustment in the vertical as well as lateral directions, and complements the adjustment achieved at both ends of the scale 20.

As indicated in the sectioned portion of FIG. 6, a window mask 50 is mounted directly beneath the viewing window 18, and contains the indicia generally shown in FIG. 5. The window mask outlines both the projected scale window 21 and the precision scale window 22. In addition, the sector reference line 27 is positioned on the window mask 50. The yieldable and adjustable mounting of the scale 20, as shown in the upper left hand corner of the sectioned portion of FIG. 6 will be described in detail hereinafter. It will be appreciated, however, that the scale is mounted between an outer scale slide 94, and an inner scale slide 95. The action of the inner scale slide spring 100 serves to maintain the scale and its related slides in a fixed focus relationship to the optical system which will be described in detail.

The heart of the optical system is shown in FIGS. 8 and 9. There it will be observed that the light path of the scale indicia has been shown diagrammatically by a pair of parallel dotted lines. The light path of the prism sector indicia has been shown by dotted lines having arrowheads spaced on the dotted lines. The light path from the illumination light bulb 46 to the scale 20 has been shown in an unbroken thin line with arrowheads thereupon at spaced positions, terminating at the face of the scale 20. The illumination of the prism sector has been shown in the same form as the prism sector image pathway. As the description of the optical system proceeds, it should be borne in mind that the ultimate to be achieved is to transmit the scale indicia and the sector indicia in such a manner as to bring the same into the juxtaposed relationship shown in FIG. 4, with an adequate provision for illumination from a single light source.

The scale illumination is achieved by directing the pathway of light from the illumination light bulb 46 through the scale light condenser lens 60, and reflecting the same first off of the scale light folding mirror 61, and then onto the small scale light reflecting mirror 62 which directs the light source onto the scale indicia on the scale 20. The image from the scale 20 is thereafter passed through the scale projection lenses 55 onto the scale lens mirror 56. The scale lens mirror 56 serves to reflect the image into its plane in which it is folded, the plane being horizontal, and the folding being in a generally triangular path as will be seen from the top view in FIG. 8. The scale image then impinges upon the scale folding mirror 58, and is reflected to one side of the mirror system where it is then again reflected by the scale prism mirror 59. At this point the image proceeds directly through the prism 32, and depending upon the angular displacement of the prism 32, is reflected to some position on the scale and sector termination mirror 54. Thereafter the scale image is reflected upwardly by the scale projection mirror 51 and is outlined by the window mask 50 until it is revealed as shown in the projected scale window 21 on FIG. 4.

The sector is illuminated by the vertical light path moving upwardly (as best shown in FIG. 9) from the illumination light bulb 46 through the sector light condensing lens 64. As illustrated in FIG. 15, a sector projection lens 65 is positioned immediately above the sector 35. Referring now particularly to FIG. 8, after the sector image leaves the sector first mirror 66 in a horizontal plane, it is then reversed off of the sector second mirror 67, and sector third mirror 68 until it is brought onto the scale and sector combination mirror 54. The sector image is transmitted upwardly toward the mask 50 of the viewing window 18 by means of the sector projection mirror 52.

In reviewing the optical system, it will be observed that the physical components for mounting the various mirrors are a bottom mirror plate 53 which is mounted to the lower portion of the bottom housing 42, and a top mirror plate 63 which is secured in spaced parallel relation to the bottom mirror plate 53, and contains the optical mirrors for the sector image reflection system. The entire mirror system, removed from the housing, is illustrated in FIGS. 13 and 14. Reference to these figures, in particular, illustrates how the prism 32 and its associated sector 35 (see particularly FIG. 14) is mounted between the top mirror plate 63 and the bottom mirror plate 53. The prism bracket arm 71 houses a cam follower 69 all integral with the prism mounting bracket 70 (see FIGS. 11 and 12). By reference to FIG. 8, it will be seen that as the adjusting knob 11 is rotated, the prism cam 81 operates against the cam follower 69 in order to rotate the prism about its axis as will be described in greater detail hereinafter.

The action of the prism 32 and its associated sector 35 will be better understood as a detailed description of its construction and positioning proceeds. Reference to FIGS. 12 and 15 will show that the prism mounting bracket 71 is provided with a prism bearing cone 74 drilled in the upper arm of the prism bracket. The lower arm of the prism bracket is provided with an opening 77, and sits atop the prism thrust bearing 80 which is seated within the bottom mirror plate 53. The cam follower spring mounting tab 72 is provided on the prism bracket arm 71, and secures one end of the cam follower retaining spring 73, the other end being mounted in the cam follower retaining spring collar 84 on the prism cam spring boss 82 of the prism cam 81. The lower portion of the prism mounting bracket 70 is provided with a cylindrical element which serves as a prism alignment cylinder 75, as it rotates within the cylindrical recess within the bottom mirror plate 53. The prism ball bearing 79 fits within the prism bearing cone 74, and is secured by means of the prism bearing retaining spring 76 which is a leaf spring, the same being secured by means of the prism spring mounting screws 78 through elongate holes in the spring (for longitudinal adjustment) to the top mirror plate 63. Thus the prism mounting bracket 70 is positioned accurately for rotation about the axis defined by the center of the prism bearing cone 74, and yieldably secured against the prism thrust bearing 80. The cam follower retaining spring 73 maintains the cam follower ball 89 in constant contact with the prism cam 81, and the action of the prism ball bearing 79 in the prism bearing cone 74 is also one of yieldable urging in a constant direction, and accordingly backlash is eliminated. Additionally, since the degree of rotation accomplished by the prism cam 81 is beyond that required to advance the sector 35 throughout its optical viewing range, wear of the cam 81 or the cam follower assembly 69 is of no effect on the accuracy of the reading, nor is wear of prism ball bearing 79 and its related prism bearing cone 74 of any moment, as the critical element of maintaining a proper center spatial relationship of the sector 35 with its optical system is provided for at all times.

The cam construction is shown in greater detail in FIGS. 16 and 17. There it will be seen that there is a knob shaft boss 85 which contains a knob shaft bore to receive the shaft of the adjusting knob 11, the same being held in position by the knob shaft set screw 86.

The focus assembly 90 is best shown in FIG. 19. There it will be seen in clear detail that the scale 20 rests in between the outer scale slide 94 and inner scale slide 95, the outer scale slide 94 having a recessed channel portion to receive the scale 20, and the inner scale slide 95 having a recessed portion 97 to accommodate the numerical and line indicia. An eccentric scale adjuster 92 is provided in which the eccentric center and the rotating center are spaced as indicated in FIG. 21. By rotating the eccentric scale adjuster 92 by means of the slot in its head portion, it shifts the lateral position of the outer scale slide 94 to accommodate variations in the alignment of the scale 20. The outer scale slide 94 is constrained by means of a tru-arc type spring 98. The inner scale slide 95 is constrained by means of the inner scale slide retaining ring 102 shown in FIG. 22. The focus screw 91 has a central open portion and an outer threaded portion where it engages the housing. By rotating the focus screw 91 against the O-ring 96, the focus screw 91 presses downwardly on the eccentric scale adjuster which in turn moves the outer scale slide 94 downwardly and thus permits a twofold adjustment of the outer scale slide 94 to constantly bring it into sliding contact with the scale 20.

On the other side of the scale 20 where the indicia are located, the inner scale slide 95 (as shown in greater detail in FIGS. 23, 24, and 25) is held in position by the inner scale slide retaining ring 102, and as best illustrated in FIG. 6, the slide retaining ring shoulder 101 abuts the inner scale slide spring 100, which holds the inner scale slide 94 constantly against the scale 20. A retaining ring 98 is provided for the outer scale slide 94, and a lock screw 99 holds the entire assembly in adjusted relationship after the adjustments with the focus screw 91 and eccentric scale adjuster 92 have been made. The material employed for the outer scale slide 94 and inner scale slide 95 is a plastic base, the product being known by the tradename Teflon.

The reader 10 is adjustably mounted to the machine tool frame 14 by means of reader mounting bracket 15 and the reader adjustable support assembly 45. The details of the construction of the support assembly 45 are shown in the partially sectioned front elevation in FIG. 9 and the cross-section of FIG. 10. There it will be seen that the principal central adjusting element is a reader support post 104 which comprises an upper spool 105 and a lower spool 106. An adjusting collar 108 with spaced radially provided turning holes 109 separates the upper and lower spools 105, 106. The adjusting collar 108 thereby serves the twofold function of supporting the reader on its upper face and providing for rotating the two offset cylindrical spools in such a manner as to adjust the reader's spatial relationship to the scale 10 in a direction transverse with the axis of the scale.

A pair of lock screws 110 are provided respectively in the reader mounting bracket 15 for the lower spool 106 and in the bottom housing 42 for the upper spool 105. As will be noted from the view in FIG. 10, the lock screw 110 is provided with a lock screw neck portion, and two threaded ends 112 which engage corresponding threads in the bracket 15 and bottom housing 42. A lock screw socket 114 is provided in one end of the lock screw in order to move the lock screws 110 in and out on their longitudinal axis. This action permits the selective locking of the upper spool 105 and the lower spool 106 both radially and longitudinally. Since the two spools are longitudinally offset, rotation of the adjusting collar 108 will progressively move the reader 10 in and out. The lateral movement of the reader 10 which is attendant to this adjustment is of no moment, because any position of the reader within one inch will not affect the readings after the entire unit has been adjusted, and moreover, the scale is adjustable for zero reading in any event as will be described in detail hereinafter. As best shown in FIG. 10, an arcuate orienting slot 115 is provided behind the upper and lower spools 105, 106 so that the spools will be locked by the lock screw 110 in a 3-point relationship the points being the point of contact with the lock screw neck 111 and the edges of the arcuate orienting slot 115.

In order to adjust the reader upwardly and downwardly, a countersunk elevating screw 116 (see FIG. 9) is provided in the bracket 15 with its head extending in overlapping relationship with the head of the lower spool 106. By raising or lowering the countersunk elevating screw, precise adjustments can be made in the height of the reader before the lower lock screw 110 is fixed in position.

As referred to above, a zero reading mounting for the scale 20 has been provided. Also the scale support is secured at both ends in such a manner as to accommodate the variations in adjustment which are attendant to the installation of a piece of precision equipment to a machine tool which has already been used. Referring now to FIGS. 26 through 29, it will be seen that the zero adjustment is accommodated by means of turning the scale adjustment knob 29, and locking the same in place by the zero adjusting lock screw 118. The zero adjusting lock screw 118, as best shown in FIG. 27, bears down on a zero adjusting lock plate 119, which as shown in phantom lines in FIG. 26, is a transverse plate which rides atop the lock plate flat 120 on the adjustment shaft 128. The lock plate set screws 121 are provided at the top of the housing 26 in order to spring the zero adjusting lock plate into a tensioned or compression relationship with the lock plate flat 120.

The scale 20 is covered at its two end portions by means of adjustable mounting boots 122, 124. These mounting boots may be molded of rubber, neoprene, or any other flexible material which will effectively seal out dirt and resist erosion by cutting lubricants and the like. Boot retaining rings 149, and their corresponding lock screws are provided to cover the flanged base portion of the mounting boots, and thereby secure them into relationship with the adjustable scale mount 26 and the fixed scale mount 28.

The adjustable scale mount 26 and the fixed scale mount 28 are both secured to the machine tool bed by means of mounting bolts 125, the nuts of which are proportioned to reach underneath the slot in the mounting ways of the adjacent machine tool and clampingly engage the adjustable scale mount 26 and fixed scale mount 28 thereto, the same being guided for longitudinal adjustment by means of the guide bolts 126.

The adjustment shaft 128 slides through a longitudinal bore in the adjustable scale mount 26, and is moved longitudinally by the interaction of the adjustment nut 129 and the threaded shaft 130, the threaded shaft 130 being secured to the scale adjustment knob 29. The connection between the scale adjustment knob 29 and the threaded shaft 130 is such that the lock pin 131 moves the adjustment shaft 128, and similarly moves the adjustment shaft head 132 in a longitudinal direction, the same being accomplished by retaining the position of the adjustment knob 29 close to the end of the adjustable scale mount 26.

The flexible mount of the scale 20 is achieved in part through the provision of a floating head 134 (see FIG. 28) which is bolted to the adjustment shaft head 132. The floating head 134 is provided with a floating head collet 138, the collet being adjustably lockable by means of the set screw 135 in the floating head collar 136. The floating head collet 138 thereby grippingly is secured to the flex rod 140, and more particularly to the end of its shaft.

The flex rod is mounted in the scale 20 by means of a bored shaft through the end of the scale 20 which has been threaded internally and into which the flex rod spacer 141 is slip-fitted to lockingly engage the flex rod head 142. A scale cap 139 having a threaded shaft to meet with the interior threaded portion of the scale 20 is provided so that it too will lockingly engage the flex rod bushing 141. As will be noted particularly in FIG. 28, the interior portion of the scale cap 139 is bored to a diameter sufficiently larger than the diameter of the shaft of the flex rod 40 so that the flex rod may move or float within the scale cap 139. The far end of the flex rod 140, however, is secured within the floating head collet 138 as described above. Thus it will be seen that at the adjustable end of the scale 20, provision has been made so that the scale 20 can flex upwardly, downwardly, or depart from its longitudinal orientation with the adjustment shaft 128.

The other end of the scale 20 which is mounted within the fixed scale mount 28 has a scale support shaft 148, and as seen in FIG. 27, the scale support shaft 148 has a threaded end portion which is screwed into the end of the scale 20 in the same manner as the flex rod bushing 121 in the threaded shaft of the scale cap 139. Thus the scale 20 is actually reversible end for end, thereby increasing its flexibility in operation. A floating head 144 is mounted to the fixed scale mount 28 by means of the floating head lock screws 145 which are positioned on 120° centers through oversize holes in the floating head 144. A floating head tapered opening 146 is provided at the center portion of the floating head 144, and accommodates the scale support shaft 148 in such a way that the scale support shaft 148 can move longitudinally as well as accommodate a 5° to 10° shift along the axis of the adjustment shaft 128. For additional clarity, it will be noted that FIGS. 30, 31, and 32 show the construction of the scale cap 139, and the flex rod 140 and flex rod head 142.

An alternative construction of the flex rod 150 is shown in FIG. 29, both in transverse sectional view and partially sectioned cross-cut taken along section line A—A. There it will be seen that the alternate flex rod 150 is provided with an alternate flex rod threaded mounting shaft 151, with an elimination of the scale cap 139. The end of the alternate flex rod 150 is fixed within the floating head collet 138 in the same manner as the preferred embodiment of the flex rod 140.

The operation of a fully adjusted reader 10 and scale 20 has already been described in detail above. The installation of the unit is equally effective because of the detailed construction of the adjustable scale mount 26 and the fixed scale mount 28 as already described in detail above. When the unit is first put into operation, the reader 10 is secured on the reader mounting bracket 15 in the position as shown in FIG. 1. Thereafter the adjustable scale mount 26 and fixed scale mount 28 are placed into position with the reader 10 being adjacent to either the adjustable scale mount 26 or the fixed scale mount 28. This locates the scale 20 and either the floating head 134, or the floating head 144 in approximately the proper position, and thereafter the first floating head is clamped tightly by means of floating head clamping screws 145 and the oversize mounting holes. The reader 10 is then moved to be adjacent the opposite scale mount, and the procedure is repeated. In addition, any variations in the positioning of the reader 10 may be accomplished by adjustment vertically or transversely to the scale by means of the operation of the reader adjustable support 45. After repeating this procedure two or three times, it will be found that the scale 20 is in excellent parallel relationship with the machine tool moving bed 12. Thereafter the focus assembly 90 (see FIGS. 19, 20) is adjusted by means of the focus screw 91, and the slotted head of the eccentric scale adjuster 92. After these few simple field adjustments, the reader is brought into fixed focus relationship with the scale and the scale is brought into fixed parallel relationship with the machine tool bed 12. As pointed out above, direct reading dimensions to the nearest ten thousandths of an inch are customarily experienced in the window 18 as shown in FIG. 2.

Although particular embodiments of the invention have been shown and described in full here, there is no intention to thereby limit the invention to the details of such embodiments. On the contrary, the intention is to cover all modifications, alternatives, embodiments, usages and equivalents of the precision optical measuring device and method as fall within the spirit and scope of the invention, specification and the appended claims.

We claim:

1. A precision optical reader for reading a scale and interpolating between adjacent graduations thereon employing a compound vernier for the same comprising, a housing, a prism having at least two plane parallel faces, prism mounting means within said housing for pivotally mounting said prism along an axis parallel with said plane faces, a first viewing area having eleven fixed indicia proportioned with adjacent parallel lines to straddle one of the indicia associated with the scale thereby providing a first vernier division of the spaces on the scale, optical means for projecting said scale graduations through said plane faces of said prism and onto said first viewing area in straddled relation with the parallel fixed indicia on the first viewing area to permit direct reading of the graduations and the first vernier division thereof, a radial scale, a second viewing area having a fixed reference mark, optical means projecting said radial scale onto said viewing area into juxtaposed relation with said fixed reference mark thereof, said radial scale having numbers between 0 and 10 and indicia dividing the intersticial area between said radial numbers, adjusting means for rotating said prism about its pivotal mounting to align said projected graduation with said fixed indicia on said first viewing area to provide said first vernier division, said radial scale being permanently fixed to said prism and simultaneously moved with said prism, the projected indicia of said radial scale in combination with said fixed reference mark of said second viewing area indicating a vernier division of the displacement of the prism to align the projected graduations with the fixed indicia on the first vernier division viewing area, the indicated distance providing said second vernier division of the first vernier division and thus providing a compound vernier action, and the scale being positioned in that relationship with the housing for maintaining a fixed-focus optical relationship is maintained between the optical means for projecting the graduations of the scale and the viewing areas.

2. The precision optical reader of claim 1, wherein said radial scale is fixed to said prism in a plane perpendicular to the prism and its axis of rotation.

3. The precision optical reader of claim 1, further including a single source of light for illuminating and projecting both said scale to be read and said radial scale onto said first and second viewing areas, respectively.

4. The precision optical reader of claim 1, wherein said prism adjusting means comprises a prism arm affixed to said prism mounting means, an eccentric wheel mounted to engage and to operate said prism arm to rotate said prism about said axis, and yieldable tension means secured to said prism arm and said eccentric wheel urging the two into constant contact.

5. The precision optical reader of claim 1, wherein said prism mounting means comprises a prism mounting bracket having spaced-apart upper and lower arms between which said prism is fixedly secured, a prism thrust bearing retained within said housing, said lower arm being seated atop said prism thrust bearing, a cylindrical recess within said housing, a prism alignment cylinder on said prism mounting bracket rotatably seated within said cylindrical recess, a prism bearing cone in said upper arm, a prism bearing retaining spring, a prism ball bearing seated within said prism bearing cone and resiliently retained therein by said prism retaining spring, said prism mounting bracket being positioned accurately for rotation about the axis defined by the center of the prism bearing cone and said prism thrust bearing and yieldably urged against said prism thrust bearing by said prism bearing retaining spring, whereby wear of said prism ball bearing and said prism bearing cone is of no moment.

6. The precision optical reader of claim 1, wherein scale mounting means comprises an inner scale slide, yieldable means urging said inner scale into sliding engagement with said scale, an outer scale slide having a radially generated surface, an eccentric adjuster having an eccentrically radially generated inner surface complementary with the outer scale slide generated surface, means for adjustably rotating the adjuster to shift the outer scale slide in a first plane, and adjustment means bearing on the adjuster to shift the latter in a plane perpendicular to the first plane.

References Cited
UNITED STATES PATENTS

| | | | |
|---|---|---|---|
| 2,311,142 | 2/1943 | Turrettini. | |
| 2,488,351 | 11/1949 | Turrettini | 88—24 |
| 2,566,875 | 9/1951 | Dietrich et al. | 88—1 |
| 2,728,991 | 1/1956 | Rinker | 88—24 X |
| 3,068,741 | 12/1962 | Werner | 350—112 X |
| 3,106,127 | 10/1963 | Koller | 88—24 |
| 3,109,048 | 10/1963 | Rantsch et al. | 88—1 |
| 3,166,626 | 1/1965 | Vargady | 88—24 |

JEWELL H. PEDERSEN, *Primary Examiner.*

W. A. SKLAR, *Assistant Examiner.*